US008135910B2

(12) United States Patent
Guthrie et al.

(10) Patent No.: US 8,135,910 B2
(45) Date of Patent: Mar. 13, 2012

(54) BANDWIDTH OF A CACHE DIRECTORY BY SLICING THE CACHE DIRECTORY INTO TWO SMALLER CACHE DIRECTORIES AND REPLICATING SNOOPING LOGIC FOR EACH SLICED CACHE DIRECTORY

(75) Inventors: Guy L. Guthrie, Austin, TX (US); William J. Starke, Round Rock, TX (US); Derek E. Williams, Austin, TX (US); Phillip G. Williams, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 1936 days.

(21) Appl. No.: 11/056,721

(22) Filed: Feb. 11, 2005

(65) Prior Publication Data

US 2006/0184747 A1 Aug. 17, 2006

(51) Int. Cl.
*G06F 12/00* (2006.01)

(52) U.S. Cl. ........ 711/118; 711/119; 711/120; 711/141; 711/144; 711/145; 711/146; 710/60

(58) Field of Classification Search .................. 711/118, 711/119, 120, 141, 144–146; 710/60
See application file for complete search history.

(56) References Cited

U.S. PATENT DOCUMENTS

| 4,961,136 | A | 10/1990 | Sato | 364/200 |
|---|---|---|---|---|
| 6,073,212 | A * | 6/2000 | Hayes et al. | 711/122 |
| 6,081,877 | A * | 6/2000 | Taki | 711/167 |
| 6,192,458 | B1 | 2/2001 | Arimilli et al. | 711/220 |
| 6,212,616 | B1 * | 4/2001 | Arimilli et al. | 711/220 |
| 6,295,598 | B1 * | 9/2001 | Bertoni et al. | 712/28 |
| 6,473,833 | B1 | 10/2002 | Arimilli et al. | 711/122 |
| 6,587,923 | B1 | 7/2003 | Benveniste et al. | 711/122 |
| 6,779,086 | B2 | 8/2004 | Arimilli et al. | 711/141 |
| 6,848,023 | B2 | 1/2005 | Teramoto | 711/127 |
| 7,039,762 | B2 * | 5/2006 | Navarro et al. | 711/127 |
| 2001/0032299 | A1 * | 10/2001 | Teramoto | 711/141 |
| 2004/0230745 | A1 * | 11/2004 | Navarro et al. | 711/127 |

OTHER PUBLICATIONS

Gochman et al., "Intel Technology Journal: The Intel Pentium M Processor: Microarchitecture and Performance", May 21, 2003, Intel Corporation, vol. 07, Issue 02, ISSN 1535-864X, pp. 20-37.*
Handy, Jim, "The Cache Memory Book", 1998, Academic Press, Inc., Second Edition, pp. 64-67 and 91.*
Intel, "Enhanced Intel SpeedStep Technology for the Intel Pentium M Processor", Mar. 2004, Intel Corporation, pp. 1-12.*

* cited by examiner

*Primary Examiner* — Arpan P. Savla
(74) *Attorney, Agent, or Firm* — Stephen J. Walder, Jr.; Diana R. Gerhardt (57) ABSTRACT

A cache, system and method for improving the snoop bandwidth of a cache directory. A cache directory may be sliced into two smaller cache directories each with its own snooping logic. By having two cache directories that can be accessed simultaneously, the bandwidth can be essentially doubled. Furthermore, a "frequency matcher" may shift the cycle speed to a lower speed upon receiving snoop addresses from the interconnect thereby slowing down the rate at which requests are transmitted to the dispatch pipelines. Each dispatch pipeline is coupled to a sliced cache directory and is configured to search the cache directory to determine if data at the received addresses is stored in the cache memory. As a result of slowing down the rate at which requests are transmitted to the dispatch pipelines and accessing the two sliced cache directories simultaneously, the bandwidth or throughput of the cache directory may be improved.

3 Claims, 7 Drawing Sheets

LEAST SIGNIFICANT BIT
ADDRESS IN CONGRUENCE CLASS FIELD

BANDWIDTH OF A CACHE DIRECTORY BY SLICING THE CACHE DIRECTORY INTO TWO SMALLER CACHE DIRECTORIES AND REPLICATING SNOOPING LOGIC FOR EACH SLICED CACHE DIRECTORY

TECHNICAL FIELD

The present invention relates to the field of caches in a multiprocessor system, and more particularly to improving the bandwidth of a cache directory by slicing the cache directory into two smaller cache directories and replicating the snooping logic for each sliced cache directory.

BACKGROUND INFORMATION

A multiprocessor system may comprise multiple processors coupled to a common shared system memory. The multiprocessor system may further include one or more levels of cache associated with each processor. A cache includes a relatively small, high speed memory ("cache memory") that contains a copy of information from one or more portions of the system memory. A Level-1 (L1) cache or primary cache may be built into the integrated circuit of the processor. The processor may be associated with additional levels of cache, such as a Level-2 (L2) cache and a Level-3 (L3) cache. These lower level caches, e.g., L2, L3, may be employed to stage data to the L1 cache and typically have progressively larger storage capacities but longer access latencies.

The cache memory may be organized as a collection of spatially mapped, fixed size storage region pools commonly referred to as "congruence classes." Each of these storage region pools typically comprises one or more storage regions of fixed granularity. These storage regions may be freely associated with any equally granular storage region in the system as long as the storage region spatially maps to a congruence class. The position of the storage region within the pool may be referred to as the "set." The intersection of each congruence class and set contains a cache line. The size of the storage granule may be referred to as the "cache line size." A unique tag may be derived from an address of a given storage granule to indicate its residency in a given congruence class and set.

When a processor generates a read request and the requested data resides in its cache memory (e.g., cache memory of L1 cache), then a cache read hit takes place. The processor may then obtain the data from the cache memory without having to access the system memory. If the data is not in the cache memory, then a cache read miss occurs. The memory request may be forwarded to the system memory and the data may subsequently be retrieved from the system memory as would normally be done if the cache did not exist. On a cache miss, the data that is retrieved from the system memory may be provided to the processor and may also be written into the cache memory due to the statistical likelihood that this data will be requested again by that processor. Likewise, if a processor generates a write request, the write data may be written to the cache memory without having to access the system memory over the system bus.

Hence, data may be stored in multiple locations. For example, data may be stored in a cache of a particular processor as well as in system memory. If a processor altered the contents of a system memory location that is duplicated in its cache memory (e.g., cache memory of L1 cache), the cache memory may be said to hold "modified" data. The system memory may be said to hold "stale" or invalid data. Problems may result if another processor (other than the processor whose cache memory is said to hold "modified" data) or bus agent, e.g., Direct Memory Access (DMA) controller, inadvertently obtained this "stale" or invalid data from system memory. Subsequently, it is required that the other processors or other bus agents are provided the most recent copy of data from either the system memory or cache memory where the data resides. This may commonly be referred to as "maintaining cache coherency." In order to maintain cache coherency, therefore, it may be necessary to monitor the system bus to see if another processor or bus agent accesses cacheable system memory. This method of monitoring the system bus is referred to in the art as "snooping."

Each cache may be associated with logic circuitry commonly referred to as a "snoop controller" configured to monitor the system bus for the snoopable addresses requested by a different processor or other bus agent. Snoopable addresses may refer to the addresses requested by the other processor or bus agent that are to be snooped by snoop controllers on the system bus. Snoop controllers may snoop these snoopable addresses to determine if copies of the snoopable addresses requested by the other processor or bus agent are within their associated cache memories using a protocol commonly referred to as Modified, Exclusive, Shared and Invalid (MESI). In the MESI protocol, an indication of a coherency state is stored in association with each unit of storage in the cache memory. This unit of storage may commonly be referred to as a "coherency granule". A "cache line" may be the size of one or more coherency granules. In the MESI protocol, the indication of the coherency state for each coherency granule in the cache memory may be stored in a cache state directory in the cache subsystem. Each coherency granule may have one of four coherency states: modified (M), exclusive (E), shared (S), or invalid (I), which may be indicated by two or more bits in the cache state directory. The modified state indicates that a coherency granule is valid only in the cache memory containing the modified or updated coherency granule and that the value of the updated coherency granule has not been written to system memory. When a coherency granule is indicated as exclusive, the coherency granule is resident in only the cache memory having the coherency granule in the exclusive state. However, the data in the exclusive state is consistent with system memory. If a coherency granule is marked as shared, the coherency granule is resident in the associated cache memory and may be in one or more cache memories in addition to the system memory. If the coherency granule is marked as shared, all of the copies of the coherency granule in all the cache memories so marked are consistent with the system memory. Finally, the invalid state may indicate that the data and the address tag associated with the coherency granule are both invalid and thus are not contained within that cache memory.

To determine whether a "cache hit" or a "cache miss" occurred from an address requested by the processor or whether a copy of a snoopable address requested by another processor or bus agent is within the cache memory, there may be logic in the cache to search what is referred to as a "cache directory". The cache directory may be searched using a portion of the bits in the snoopable address or the address requested by the processor. The cache directory, as mentioned above, stores the coherency state for each coherency granule in the cache memory. The cache directory also stores a unique tag used to indicate whether data from a particular address is stored in the cache memory. This unique tag may be compared with particular bits from the snoopable address and the address requested by the processor. If there is a match, then the data contained at the requested address lies within the cache memory. Hence, the cache directory may be searched to determine if the data contained at the requested or snoopable address lies within the cache memory.

Figure 1:
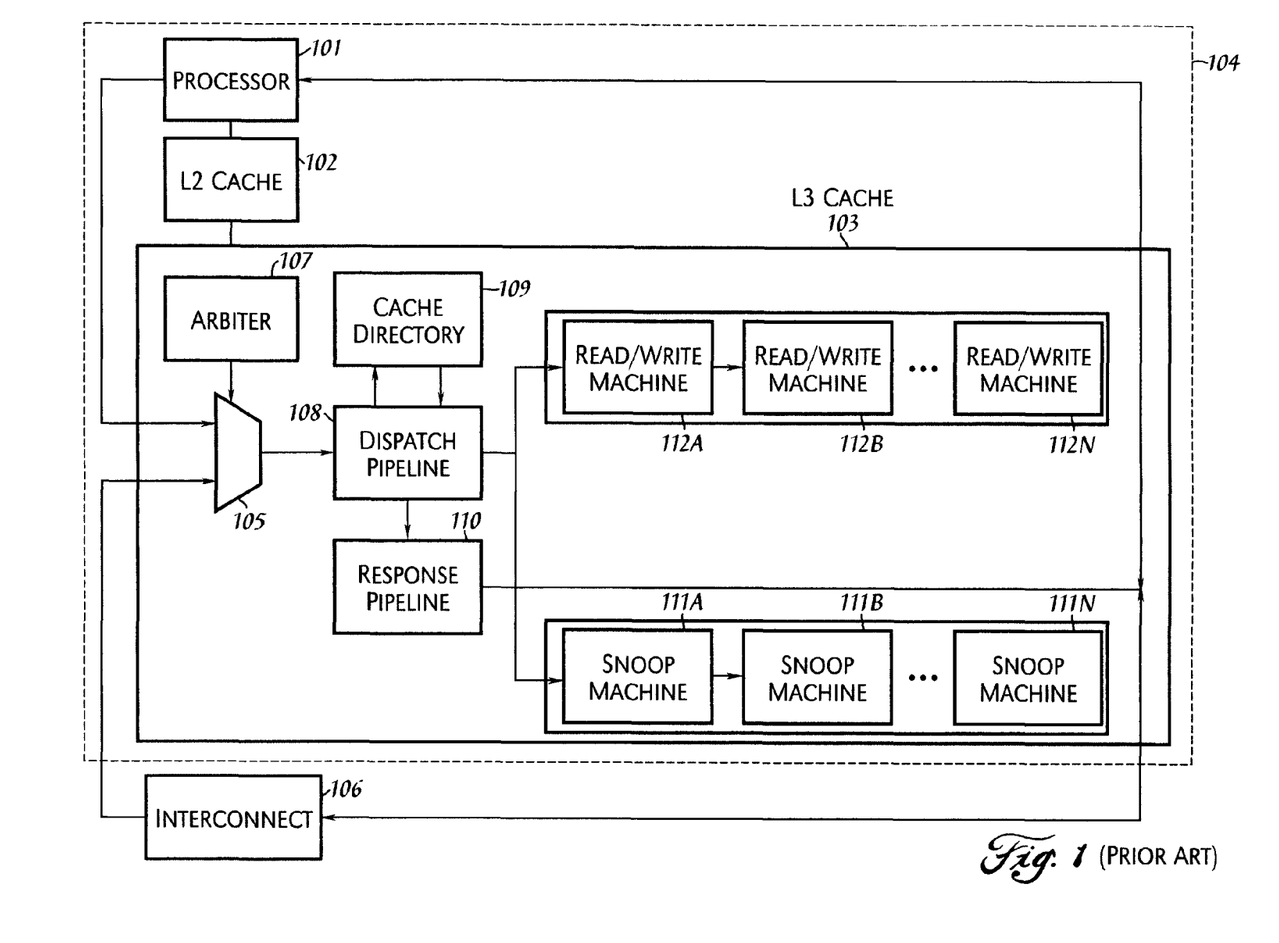
FIG. 1 illustrates internal components of an L3 cache.

An example of a processor associated with multiple levels of caches incorporating the above-mentioned concepts is described below in association with FIG. 1. Referring to FIG. 1, FIG. 1 illustrates a processor 101 coupled to an L2 cache 102 which is coupled to an L3 cache 103. Processor 101, L2 cache 102 and L3 cache 103 may be implemented on an integrated circuit 104. L3 cache 103 may include a multiplexer 105 configured to receive requests from processor 101, such as a read or write request described above, as well as the snoopable address via an interconnect 106. Interconnect 106 is connected to a system bus (not shown) which is connected to other processors (not shown) or bus agents (not shown). An arbitration mechanism 107 may determine which of the two requests (requests from interconnect 106 and from processor 101) gets serviced. The selected request is dispatched into a dispatch pipeline 108. Dispatch pipeline 108 is coupled to a cache directory 109. Dispatch pipeline 108 may contain logic configured to determine if the data at the requested address lies within the cache memory (not shown) of L3 cache 103. Dispatch pipeline 108 may determine if the data at the requested address lies within the cache memory by comparing the tag values in cache directory 109 with the value stored in particular bits in the requested address. As mentioned above, if there is a match, then the data contained at the requested address lies within the cache memory. Otherwise, the cache memory does not store the data at the requested address. The result may be transmitted to a response pipeline 110 configured to transmit an indication as to whether the data at the requested address lies within the cache memory. The result may be transmitted to either processor 101 or to another processor (not shown) or bus agent (not shown) via interconnect 106.

Dispatch pipeline 108 may further dispatch the result, e.g., cache hit, to processor's 101 requests to read/write machines 112A-N, where N is any number. Read/write machines 112A-N may collectively or individually be referred to as read/write machines 112 or read/write machine 112, respectively. Read/write machines 112 may be configured to execute these requests, e.g., read request, for processor 101.

Dispatch pipeline 108 may further dispatch the result to requests from interconnect 106 to snooping logic, referred to herein as "snoop machines" 111A-N, where N is any number. Snooop machines 111A-N may collectively or individually be referred to as snoop machines 111 or snoop machine 111, respectively. Snoop machines 111 may be configured to respond to the requests from other processors or bus agents. Snoop machines 110 may further be configured to write modified data in the cache memory of L3 cache 103 to the system memory (not shown) to maintain cache coherency.

As stated above, the lower cache levels, e.g., L2, L3, may be employed to stage data to the L1 cache and typically have progressively larger storage capacities. As semiconductor technology advances, there continues to be an exponential growth in the number of transistors per integrated circuit as predicted by Gordon Moore (commonly referred to as Moore's Law). As the number of transistors per integrated circuit continues to increase, the amount of information that may be stored in a cache memory increases thereby resulting an increase in the number of entries in cache directories.

However, the speed or frequency of operation in computers continues to increase as well. As the frequency of operation increases, the rate at which requests, such as the requests from interconnect 106, to be serviced increases as well. However, the speed at which a cache directory may be accessed is not keeping up with the increased speed of operation. Consequently, a request from interconnect 106 may have to be denied and requested to be retried again which may result in hundreds of additional clock cycles of delay. If the snoop bandwidth or throughput of the cache directory could be improved, then fewer requests from interconnect 106 would be denied.

Therefore, there is a need in the art to improve the snoop bandwidth or throughput of the cache directory thereby reducing the number of requests denied.

SUMMARY

The problems outlined above may at least in part be solved in some embodiments by slicing a cache directory into two smaller cache directories each with its own snooping logic (snoop machines as described herein). One of the cache directories may store information (tag values which are used to identify addresses whose data are stored in the cache memory and the state of such data stored in the cache memory) for addresses where the value of a particular bit in the address is zero. The other cache directory may store the same type of information for addresses where the value of the same particular bit in the address is a logical value of one. This results in two cache directory slices that may be accessed simultaneously thereby improving the bandwidth of the cache directory. Furthermore, a unit, referred to herein as a "frequency matcher", may shift the cycle speed to a lower speed upon receiving requests (snooped addresses) from the interconnect thereby slowing down the rate at which requests are transmitted to the dispatch pipelines (one for each sliced cache directory) Each dispatch pipeline is coupled to a sliced cache directory and is configured to search the cache directory to determine if any tag values stored in the cache directory matches the value stored in the tag field of the received address. As a result of slowing down the rate at which requests are transmitted to the dispatch pipeline and accessing the sliced cache directories simultaneously, the dispatch pipelines can service the incoming requests at the same rate they are received. Upon servicing these requests by the dispatch pipeline, the responses may be sent to another frequency matcher that shifts the cycle speed to a higher speed thereby transmitting these responses to the interconnect at a substantially similar speed as the speed that the interconnect received the snoop addresses. As a result of the foregoing, the snoop bandwidth or throughput of the cache directory may be improved.

In one embodiment of the present invention, a cache may include a first unit configured to shift a cycle speed to a lower speed where the first unit is configured to receive a first and a second address. The first unit may be further configured to read a value in a bit in each of the first and second addresses. The cache may further include a first cache directory coupled to the first unit where the first cache directory is comprised of entries indicating data stored in a cache memory at addresses with a value of zero at the bit read by the first unit. The cache may further include a second cache directory coupled to the first unit where the second cache directory is comprised of entries indicating data stored in the cache memory at addresses with a value of a logical one at the bit read by the first unit. The first unit may be further configured to determine which of the first and second cache directories to search for one of the first and second addresses based on the value read in the first and second addresses.

The foregoing has outlined rather generally the features and technical advantages of one or more embodiments of the present invention in order that the detailed description of the present invention that follows may be better understood.

Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a cache, system and method for improving the snoop bandwidth of a cache directory. In one embodiment of the present invention, a cache directory may be sliced into two smaller cache directories each with its own snooping logic (snoop machines as described herein). One of the cache directories may store information (tag values used to identify addresses whose data is stored in the cache memory and the state of such data stored in the cache memory) for addresses where the value of a particular bit in the address is zero. The other cache directory may store the same type of information for addresses where the value of the same particular bit in the address is a logical value of one. This results in two cache directory slices that may be accessed simultaneously thereby essentially doubling the bandwidth. Furthermore, a unit, referred to herein as a "frequency matcher", may shift the cycle speed to a lower speed upon receiving requests (snoop addresses) from the interconnect thereby slowing down the rate at which requests are transmitted to the dispatch pipelines. Each dispatch pipeline is coupled to a sliced cache directory and is configured to search the cache directory to determine if any tag values stored in the cache directory matches the value stored in the tag field of the received address. As a result of slowing down the rate at which requests are transmitted to the dispatch pipelines and accessing the two sliced cache directories simultaneously, the snoop bandwidth or throughput of the cache directory may be improved.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 2:
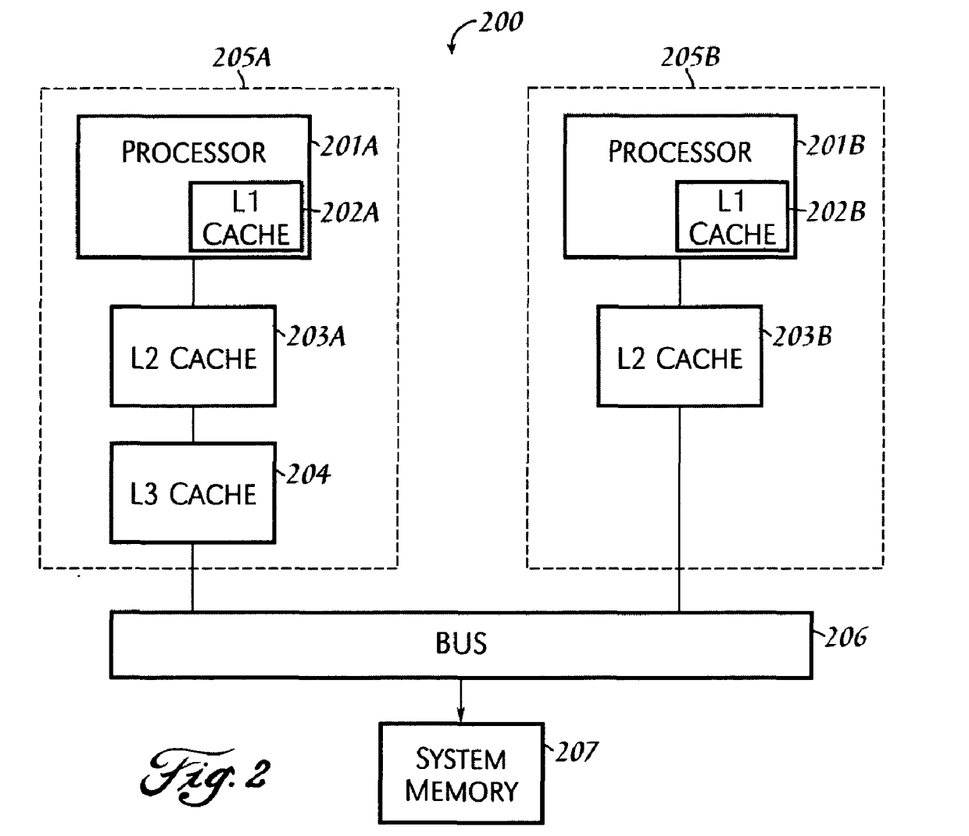
FIG. 2 illustrates a multiprocessor system configured in accordance with an embodiment of the present invention.

FIG. 2—Multiprocessor System

FIG. 2 illustrates an embodiment of the present invention of a multiprocessor system 200. System 200 may include one or more processors 201A-B. Processors 201A-B may collectively or individually be referred to as processors 201 or processor 201, respectively. Processors 201A-B may each include a level one (L1) cache 202A-B, e.g., L1 instruction/data cache, respectively. L1 caches 202A-B may be configured to store instruction and data values that may be repeatedly accessed by processors 201A-B, respectively. L1 caches 202A-B may collectively or individually be referred to as L1 caches 202 or L1 cache 202, respectively. It is noted that those skilled in the art will recognize that multiple L1 caches, e.g., L1 instruction cache, L1 data cache, may be implemented instead of a unified L1 cache.

In order to minimize data access latency, one or more additional levels of cache coupled to processors 201 may be implemented such as a level two (L2) cache 203A-B coupled to processors 201A-B, respectively. L2 caches 203A-B may collectively or individually be referred to as L2 caches 203 or L2 cache 203, respectively. Furthermore, FIG. 2 illustrates a level three (L3) cache 204 coupled to L2 cache 203A. The lower cache levels may be employed to stage data to an L1 cache 202 and typically have progressively larger storage capacities but longer access latencies. It is noted that processors 201 may each be coupled to any number of additional levels of cache. It is further noted that in one embodiment, each processor 201A-B and associated lower cache levels may reside on a single intergraded circuit 205A-B, respectively.

Referring to FIG. 2, each processor 201 may be coupled to a bus 206. Bus 206 may subsequently permit the transmit of information, e.g., addresses, data, between processors 201 and a system memory 207. It is noted that system 200 may include any number of processors 201 coupled to system memory 207 via bus 206. It is further noted that FIG. 2 is not to be limited in scope to any particular embodiment and that FIG. 2 is illustrative.

Referring to FIG. 2, processor 201 may generate a transfer request to be received by bus 206. A "transfer request" may refer to either a request to read an address not within its associated cache memory(ies) or a request to write to an address not exclusively owned by its associated cache memory(ies).

Bus 206 may contain logic configured to determine if the received transfer request is snoopable ("snoopable transfer request"). That is, bus 206 may contain logic configured to determine if the received transfer request is to be broadcast to the other snoop controllers (not shown) not associated with processor 201 that generated the transfer request. The other snoop controllers (not shown) may be configured to determine if a copy of the requested snoopable address, i.e., a copy of the requested coherency granule(s), is within their associated cache memories. The broadcasted transfer request may commonly be referred to as a "snoop request."

As stated in the Background Information section, the speed or frequency of operation in computers continues to increase. As the frequency of operation increases, the rate at which requests, such as the requests from an interconnect to an L3 cache, to be serviced increases as well. However, the speed at which a cache directory may be accessed is not keeping up with the increased speed of operation. Consequently, a request from the interconnect may have to be denied and requested to be retried again which may result in hundreds of additional clock cycles of delay. If the snoop bandwidth or throughput of the cache directory could be improved, then fewer requests from the interconnect would be denied. Therefore, there is a need in the art to improve the snoop bandwidth or throughput of the cache directory thereby reducing the number of requests denied.

Figure 3:
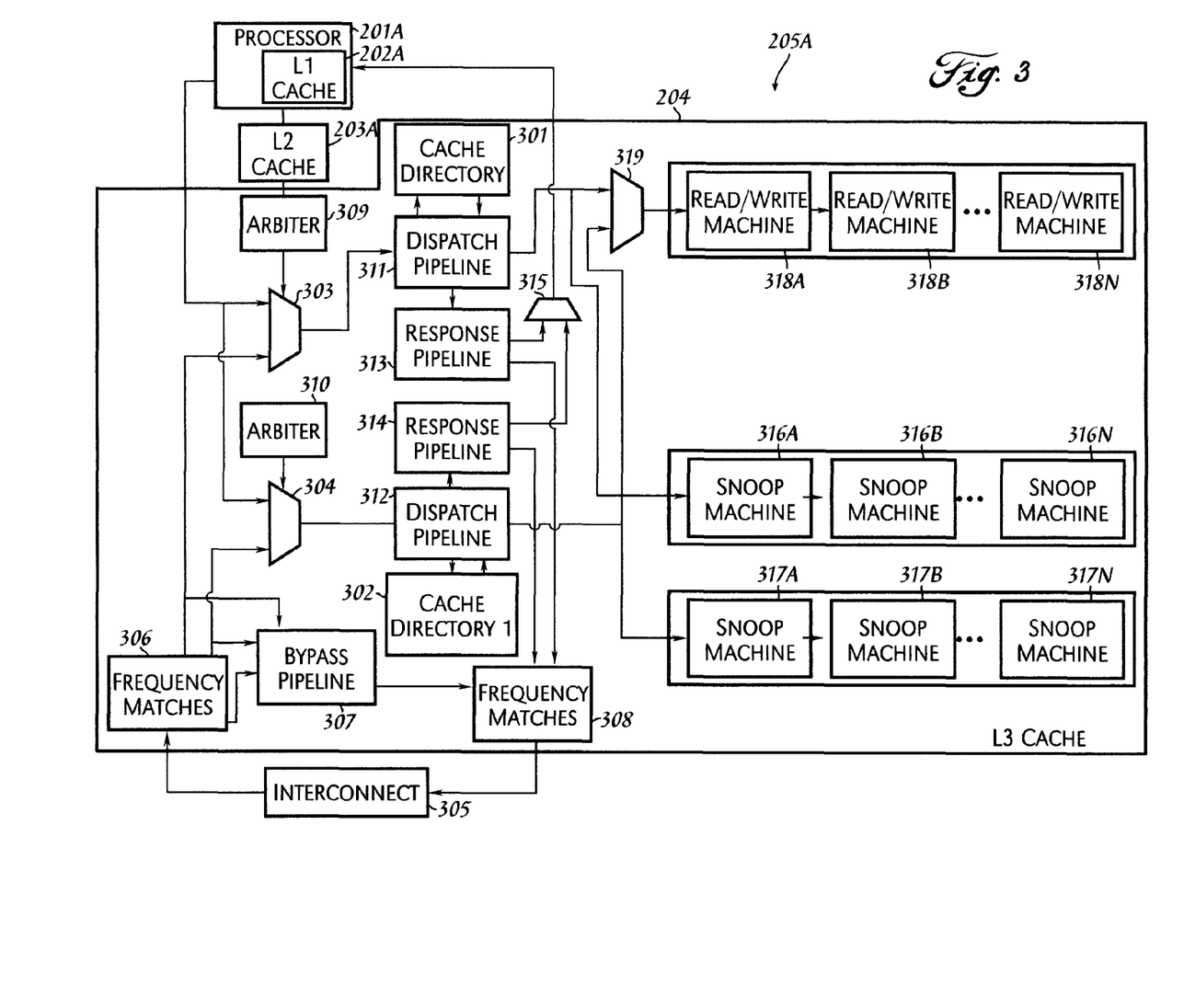
FIG. 3 illustrates an L3 cache with a cache directory sliced into two separate cache directories along with replicated snooping logic for each sliced cache directory in accordance with an embodiment of the present invention.
Figure 4:
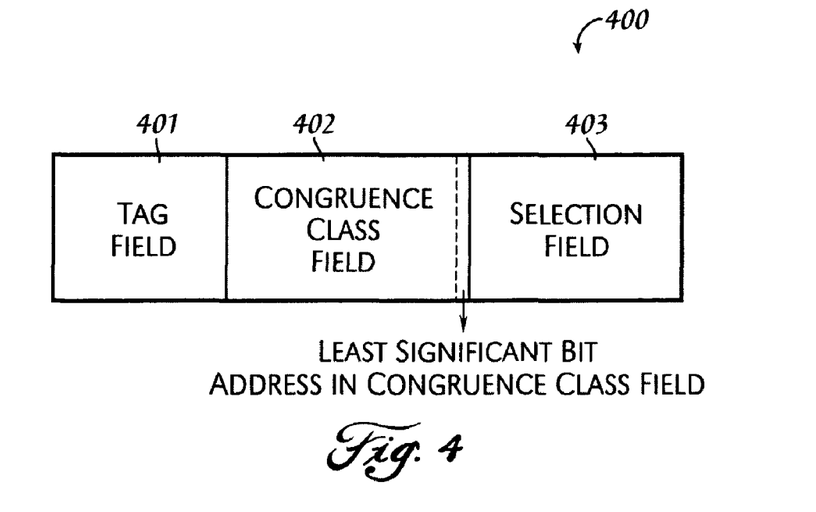
FIG. 4 illustrates the fields of an address in accordance with an embodiment of the present invention.
Figure 5:
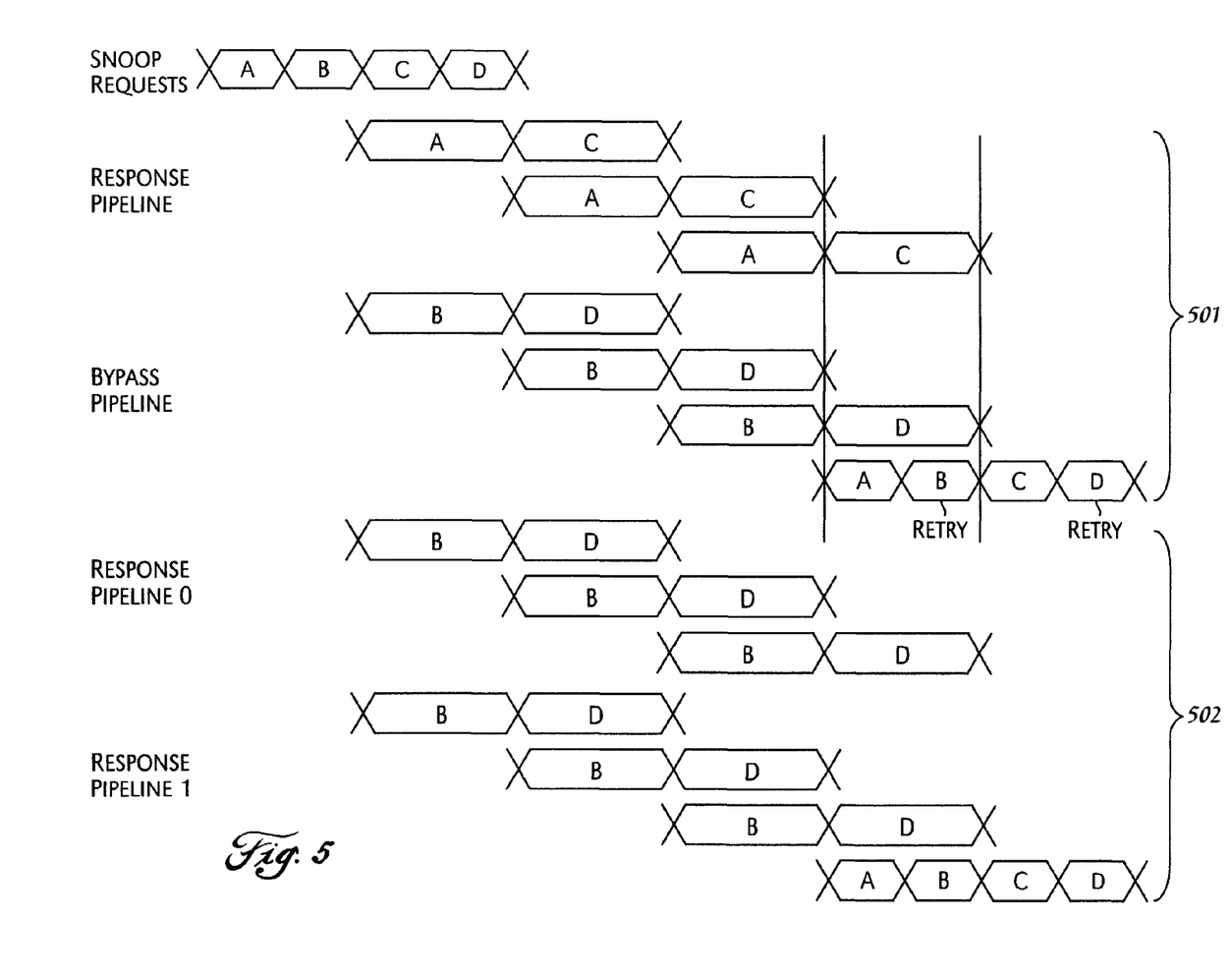
FIG. 5 illustrates the increase in the snoop bandwidth of the cache directory in accordance with an embodiment of the present invention.
Figure 6A:
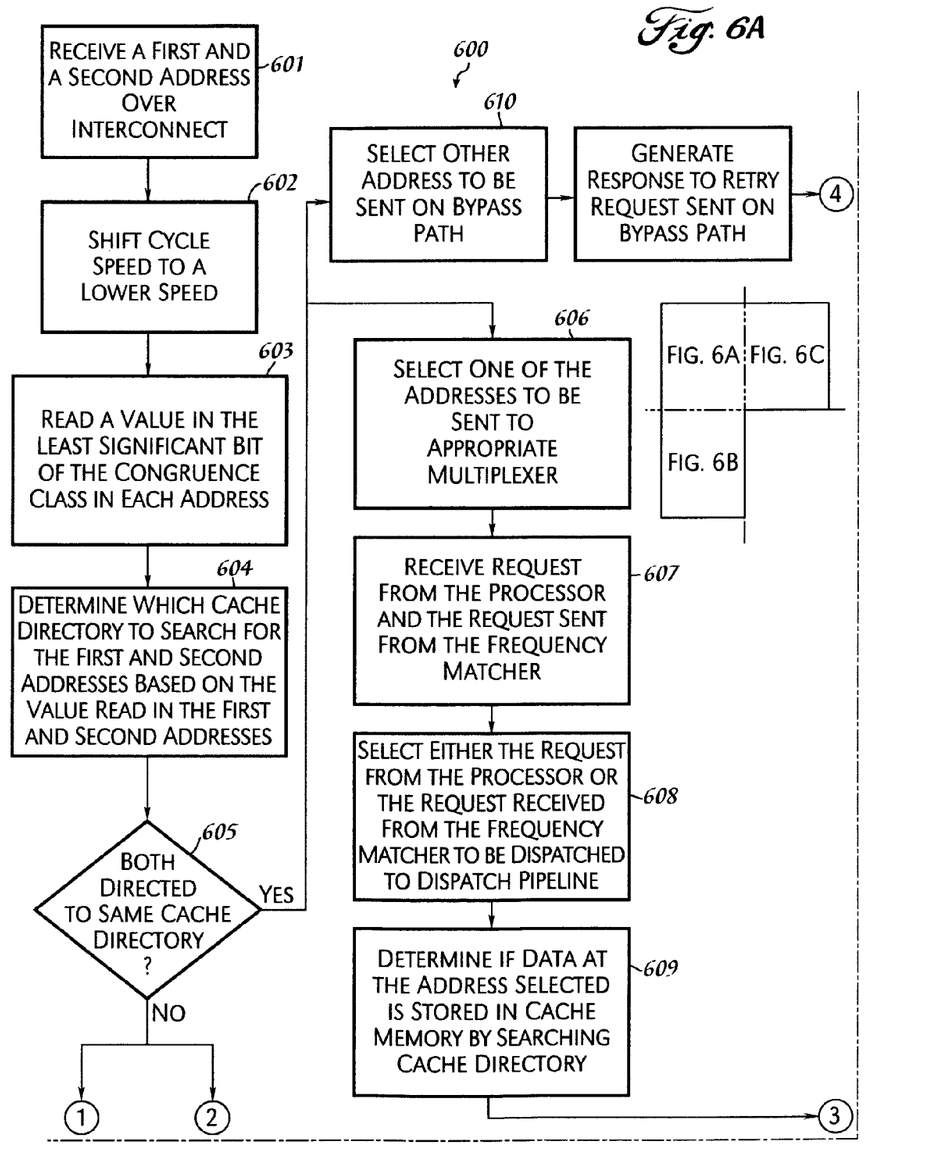
FIGS. 6A-C are a flowchart of a method for improving the snoop bandwidth of a cache directory in accordance with an embodiment of the present invention.
Figure 6B:
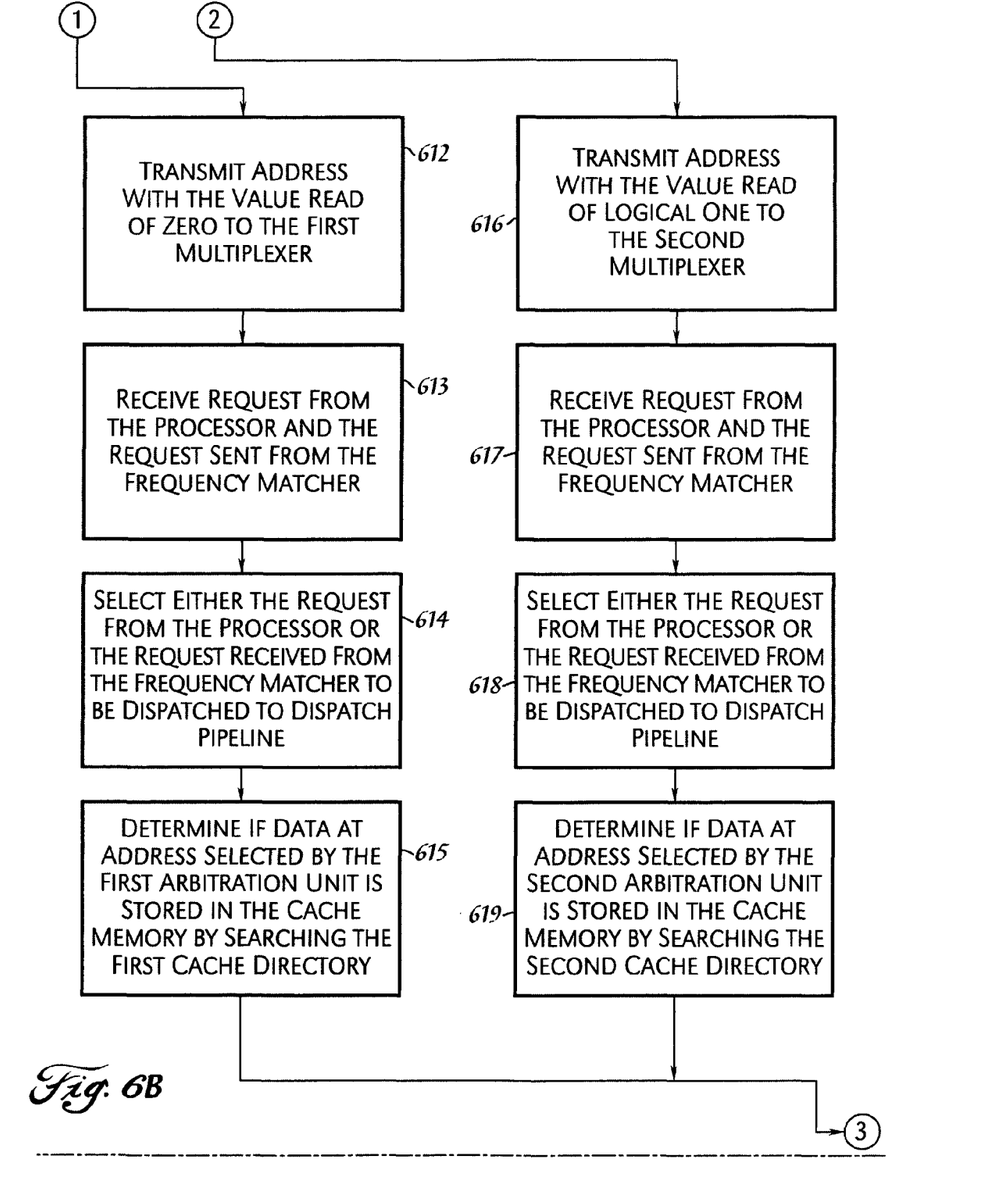
Figure 6C:
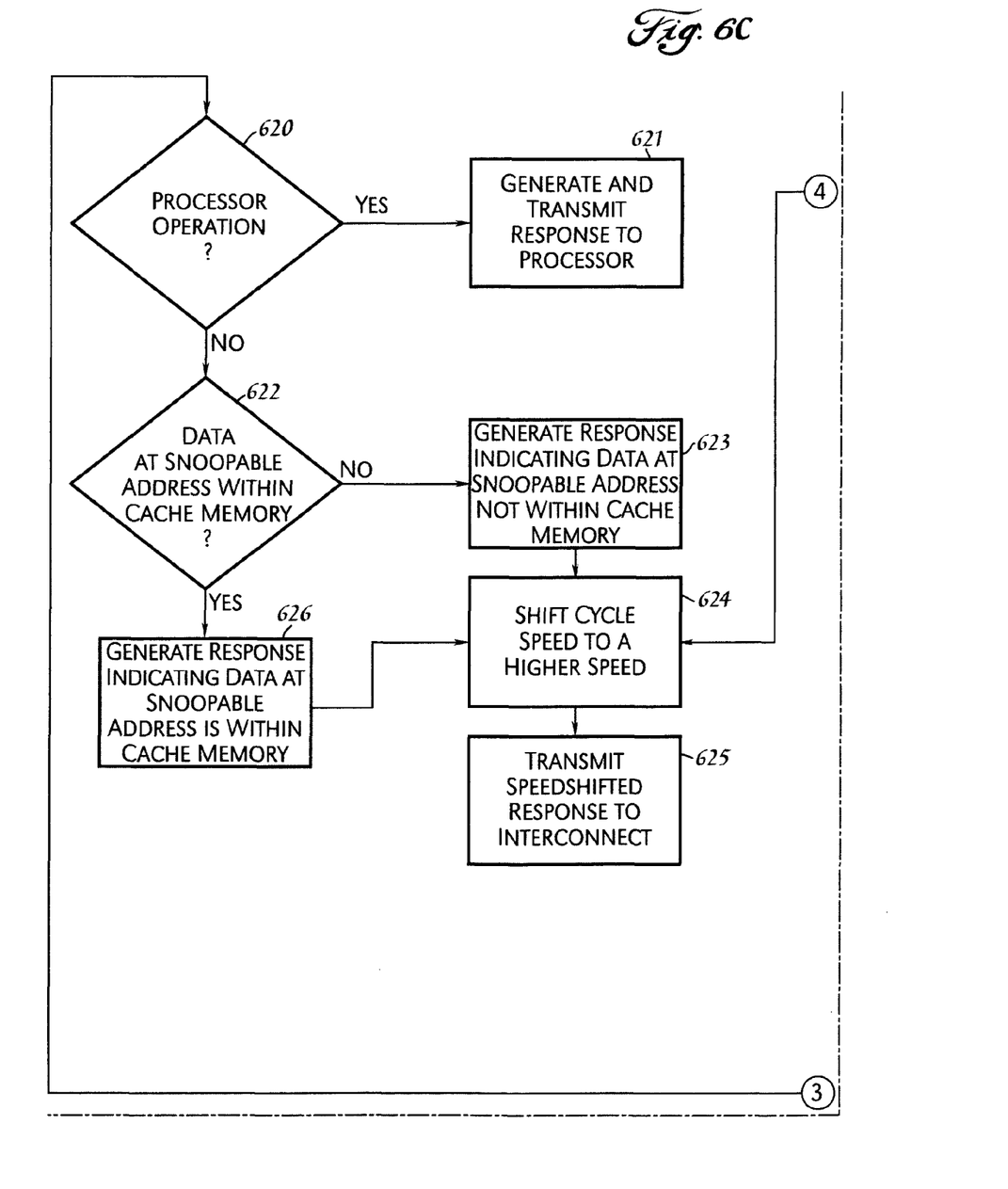

A mechanism for improving the snoop bandwidth of a cache directory is described below in association with FIGS. 3-5. FIG. 3 illustrates the mechanism for improving the snoop bandwidth of a cache directory in L3 cache 204 in integrated circuit 205A. It is noted that the mechanism may be implemented in any cache and that the principles of the present invention described in FIG. 3 may be applied to any cache. FIG. 4 illustrates which bit is used in an incoming address to determine which cache directory to search as discussed in further detail below. FIG. 5 illustrates the increase in the snoop bandwidth of the cache directory using the mechanism of FIG. 3. FIGS. 6A-C are a flowchart of a method for improving the snoop bandwidth of a cache directory using the mechanism as described in FIG. 3.

FIG. 3—L3 Cache Incorporated with Mechanism to Improve Snoop Bandwidth of Cache Directory FIG. 3 illustrates an embodiment of the present invention of an integrated circuit 205A (FIG. 2) that includes a lower level cache, L3 cache 204, that includes a mechanism for improving the snoop bandwidth of a cache directory.

Referring to FIG. 3, L3 cache 204 includes a cache directory that is sliced (separated) into multiple cache directories 301, 302. For example, cache directory 301 may be configured to store data for addresses with a particular bit, e.g., least significant bit in the congruence class field of the address, having the value of zero. Cache directory 302 may be configured to store data for addresses with the particular bit having a logical value of one. By slicing the cache directory, such as cache directory 109 (FIG. 1), into separate smaller cache directories, each cache directory 301, 302 may be accessed simultaneously thereby improving the bandwidth of a single cache directory.

The following description will describe how a particular request is selected to be dispatched to the dispatch pipeline coupled to cache directories 301, 302. Referring to FIG. 3, L3 cache 204 may include multiplexers 303, 304 where each is configured to receive a read or write request from processor 201A as well as a request (snoopable address) received via an interconnect 305. Interconnect 305 is connected to a system bus 206 (FIG. 2) which is connected to another processor 201 or bus agent (not shown). Interconnect 305 may receive multiple snoopable addresses (referred to as snoopable transfer requests above). These multiple snoopable addresses may be forwarded to a unit, referred to herein as a "frequency matcher" 306, configured to shift the cycle speed to a lower speed. Frequency matcher 306 may be configured to group multiple snoop requests received from interconnect 305 and transmit copies of the multiple snoop requests on multiples pipelines (dispatch and bypass as discussed below) at a lower speed, such as the rate that cache directory 301, 302 can be accessed. For example, suppose that frequency matcher 306 receives two snoop requests at frequency x. Frequency matcher 306 may then group these two snoop requests and transmit one of the snoop requests onto a bypass pipeline 307 (discussed further below) at a rate of x/2 and the other snoop request to multiplexer 303, 304 which may be accepted by arbiter 309, 310 (discussed further below) and dispatched to dispatch pipeline 311, 312 (discussed further below) at a rate of x/2. Frequency matcher 306 sends these snoop requests at a slower rate to substantially correspond to the rate at which cache directory 301, 302 can be accessed. By shifting the clock speed to a lower speed, the rate at which dispatch pipeline 311, 312 (discussed further below) receives the snoop requests may substantially correspond to the rate that dispatch pipeline 311, 312 accesses the cache directory, such as cache directory 301, 302, thereby improving the bandwidth of the cache directory. Thus, as a result of slicing the cache directory, such as cache directory 109 (FIG. 1), into separate smaller cache directories, and reducing the rate at which snoop requests are transmitted to a dispatch pipeline, the snoop bandwidth or throughput of the cache directory may be improved.

Frequency matcher 306 may further be configured to read a value in a particular bit in the received addresses. For example, frequency matcher 306 may be configured to read the least significant bit in the congruence class field of the address as illustrated in FIG. 4.

Referring to FIG. 4, in conjunction with FIG. 3, FIG. 4 illustrates an embodiment of an address 400 divided into fields 401-403. Field 401 may be referred to as a tag field configured to store a "tag." This tag may be used to compare to the tag stored in cache directory 301, 302 used to identify a particular address. If the tag in the address received by frequency matcher 306 matches the tag stored in cache directory 301, 302, then the data contained at the requested address lies within the cache memory (not shown) of L3 cache 204. Otherwise, cache memory does not store the data contained at the requested address. Field 402 may be referred to as the congruence class field used to store a value that selects a congruence class in the cache memory. Field 403 may be referred to as the selection field used to select a particular byte in the cache line.

Referring to FIG. 3, in conjunction with FIG. 4, as stated above, frequency matcher 306 may be configured to read the least significant bit in congruence class field 402 of address 400 in order to slice the cache directory as described below. It is noted that the least significant bit may be read in congruence class field 402 versus other bits in congruence class field 402 since the least significant bit value changes more rapidly than other bit values in field 402. It is further noted that the value in another bit in field 402 may be used to slice a cache directory and that such embodiments would fall within the scope of the present invention.

Upon reading the value in the least significant bit in congruence class field 402 for the two received snoopable addresses, frequency matcher 306 may further be configured to determine which cache directory 301, 302 to search for these addresses based on the value read. For example, if the least significant bit in congruence class field 402 in the received address stores a value of 0, then that address may be selected to be searched in cache directory 301. Cache directory 301 may be configured to store data for addresses with a value of 0 in the least significant bit in congruence class field 402. Conversely, if the least significant bit in congruence class field 402 in the received address stores a logical value of 1, then that address may be selected to be searched in cache directory 302. Cache directory 302 may be configured to store data for addresses with a logical value of 1 in the least significant bit in congruence class field 402. If both of the received addresses have the same value in the least significant bit in congruence class field 402, then frequency matcher 306 may further be configured to select one of the two address to be sent on the "bypass pipeline" 307 connected to another frequency matcher 308. If both of the received addresses have a different value in the least significant bit in congruence class field 402, then frequency matcher 306 may further be configured to transmit the address to the appropriate multiplexer 303, 304. If the value in the least significant bit in congruence class field 402 is zero, then frequency matcher 306 may transmit the request to multiplexer 303. Otherwise, frequency matcher 306 may transmit the request to multiplexer 304.

Each multiplexer 303, 304 may also be configured to receive a read or write request from processor 201A. Each multiplexer 303, 304 may select either the request from processor 201A or the request received from interconnect 305. The selection made by multiplexer 303, 304 may be based on an arbitration algorithm selected by arbiter 309, 310, respectively. The request selected by multiplexer 303, 304 may be inputted to dispatch pipeline 311, 312, respectively. Dispatch pipeline 311 is coupled to cache directory 301 and dispatch pipeline 312 is coupled to cache directory 302.

Dispatch pipeline 311, 312 may contain logic configured to determine if the data at the requested address lies within the cache memory of L3 cache 204. The result may be transmitted to a response pipeline 313, 314 by dispatch pipeline 311, 312, respectively. Response pipeline 313 is coupled to dispatch pipeline 311 and response pipeline 314 is coupled to dispatch pipeline 312.

Response pipeline 313, 314 may be configured to transmit an indication to processor 201A and interconnect 305 as to whether the data at the requested address lies within the cache memory of L3 cache 204. Response pipelines 313, 314 send the responses to multiplexer 315 used to combine the responses from response pipeline 313, 314 and send an output to processor 201A. Response pipeline 313, 314 sends a null value to multiplexer 315 when the result is designated for interconnect 305 and not for processor 201A. The select input of multiplexer 315 may receive an indication from arbiter 309, 310 (indication not shown in FIG. 3) indicating whether the request was a snoop request or a request from processor 201A. In this manner, multiplexer 315 may be able to transmit the result to a processor 201A request to processor 201A.

Further, response pipelines 313, 314 send their responses with the destination of interconnect 305 to frequency matcher 308. Frequency matcher 308 is configured to shift the cycle speed to a higher speed, the speed at which requests are received by interconnect 305. Upon shifting the cycle speed to a higher speed, the received responses are sent to interconnect 305. Frequency matcher 308 may be further configured to generate a response indicating to retry sending the snoopable address for addresses sent on bypass pipeline 307. These generated responses may be sent to interconnect 305.

Referring to FIG. 3, dispatch pipelines 311,312 may further be configured to dispatch the result to requests from interconnect 305 to snooping logic, referred to herein as "snoop machines" 316A-N, 317A-N, respectively, where N is any number. Snooop machines 316A-N may collectively or individually be referred to as snoop machines 316 or snoop machine 316, respectively. Snooop machines 317A-N may collectively or individually be referred to as snoop machines 317 or snoop machine 317, respectively. Snoop machines 316, 317 may be configured to respond to the requests from the other processors or bus agents. Snoop machines 316, 317 may further be configured to write modified data in the cache memory of L3 cache 204 (indicated by cache directory 301, 302) to the system memory (not shown) to maintain cache coherency. In another embodiment, dispatch pipelines 311, 312 may be coupled to a single set of snoop machines instead of separate sets of snoop machines as illustrated in FIG. 3. It is noted that embodiments incorporating a single set of snoop machines coupled to dispatch pipelines 311, 312 would fall within the scope of the present invention.

Dispatch pipelines 311,312 may further be configured to dispatch the result to processor's 201A requests to read/write machines 318A-N, where N is any number, via multiplexer 319. Read/write machines 318A-N may collectively or individually be referred to as read/write machines 318 or read/write machine 318, respectively. Read/write machines 318 may be configured to execute these requests, e.g., read request, for processor 201A. Multiplexer 319 may be used to decide which of the requests from dispatch pipelines 311, 312 are selected. The select input of multiplexer 319 may receive an indication from arbiter 309, 310 (indication not shown in FIG. 3) indicating whether dispatch pipeline 311, 312 was active.

It is noted that FIG. 3 does not depict a series of frequency matchers on the processor side (side of processor 201A) as it is assumed that processor 201A operates at a slower speed than the speed at which interconnect 305 receives the snoopable addresses and hence there is not an inflow problem on the processor side as there is on the side of interconnect 305. However, a person of ordinary skill in the art would be capable of applying a series of frequency matchers on the processor side of FIG. 3 if there existed an inflow problem on the processor side as well.

A diagram illustrating the increase of snoop bandwidth or throughput of a cache directory using the above described mechanism is provided below in association with FIG. 5.

FIG. 5—Diagram Illustrating Improved Snoop Bandwidth and Throughput of Cache Directory FIG. 5 is a diagram illustrating the increase in the snoop bandwidth of a cache directory in accordance with an embodiment of the present invention. Referring to FIG. 5, FIG. 5 illustrates which clock cycles the responses described above are transmitted onto interconnect 305 using the prior art mechanism (FIG. 1) and using the mechanism of FIG. 3. The prior art mechanism produces the results as indicated by section 501; whereas, the mechanism of FIG. 3 produces the results as indicated by section 502.

Referring to FIG. 5 in conjunction with FIG. 1, as illustrated in section 501, the snoop requests (snoopable addresses) labeled A, B, C and D may be received from interconnect 106. Snoop request A may be selected by arbiter 107; whereas, snoop request B may be denied. The denied request, snoop request B, may be transmitted on a bypass pipeline (not shown in FIG. 1). The accepted snoop request, snoop request A, will be dispatched to a single dispatch pipeline, such as dispatch pipeline 108. After dispatch pipeline 108 searches cache directory 109 to determine if the data at the requested address lies within the cache memory, the result (indication as to whether data at the requested address lies within the cache memory) may be transmitted to response pipeline 110 (labeled as "response pipeline" in FIG. 5).

Similarly, snoop request C may be selected by arbiter 107; whereas, snoop request D may be denied. The denied request, snoop request D, may be transmitted on a bypass pipeline. The accepted snoop request, such as snoop request C, will be dispatched to a single dispatch pipeline, such as dispatch pipeline 108. After dispatch pipeline 108 searches cache directory 109 to determine if the data at the requested address lies within the cache memory, the result (indication as to whether data at the requested address lies within the cache memory) may be transmitted to response pipeline 110.

As illustrated in the bottom portion of Section 501, the response to snoop requests A and C are transmitted to interconnect 106 on schedule. However, snoop requests B and D are rejected and therefore requests to retry resending snoop requests B and D are transmitted to interconnect 106.

Referring to FIG. 5, in conjunction with FIGS. 3 and 4, as illustrated in section 502 of FIG. 5, the snoop requests (snoopable addresses) labeled A, B, C and D may be received by frequency matcher 306 from interconnect 305. Snoop requests A and B may be grouped into one group and snoop requests C and D may be grouped into another group by frequency matcher 306. Snoop request A may be dispatched to multiplexer 303 while snoop request B may be dispatched to multiplexer 304 at a slower rate than the rate at which the snoop requests were transmitted by interconnect 305 as discussed above. Upon arbiter 309, 310 accepting snoop requests A and B, respectively, these are dispatched to dispatch pipelines 311, 312, respectively.

Similarly, snoop request C may be dispatched to multiplexer 303 while snoop request D may be dispatched to multiplexer 304 at a slower rate than the rate at which the snoop requests were transmitted by interconnect 305. Upon arbiter 309, 310 accepting snoop requests C and D, respectively, these are dispatched to dispatch pipelines 311, 312, respectively.

As explained above, the mechanism of FIG. 3 slices the cache directory into separate cache directories 301, 302 with their own dispatch pipelines 311, 312, respectively. Cache directory 301 may be configured to store data for addresses with a value of 0 in the least significant bit in congruence class field 402; whereas, cache directory 302 may be configured to store data for addresses with a logical value of 1 in the least significant bit in congruence class field 402. Hence, assuming that addresses are uniformly distributed (the number of addresses that have a value of 0 in the least significant bit in congruence class field 402 is about equal with the number of addresses that have the logical value of 1 in the least significant bit in congruence class field 402), there is a likelihood that an equal number of addresses will be dispatched to dispatch pipeline 311 and dispatched to dispatch pipeline 312. Hence, in the example of FIG. 5, snoop requests A and C are dispatched to dispatch pipeline 311 every other cycle and snoop requests B and D are dispatched to dispatch pipeline 312 every other cycle. It is noted that these snoop requests, A, B, C and D, could have been dispatched to a different dispatch pipeline than illustrated; however, the second snoop request in the group is not transmitted to the same dispatch pipeline as the first snoop request in the group.

After each dispatch pipeline 311, 312 searches cache directory 301, 302, respectively, to determine if the data at the requested address lies within the cache memory, the result (indication as to whether data at the requested address lies within the cache memory) may then be transmitted to response pipeline 313, 314, respectively (labeled as response pipeline 0 and response pipeline 1, respectively, in FIG. 5).

As illustrated in the bottom portion of Section 502, response pipeline 313, 314 may transmit the result to snoop requests A, B, C and D to interconnect 305 every cycle instead of every other cycle since the responses from response pipelines 313, 314 are shifted to a higher speed by frequency matcher 308 and since snoop requests B and D were not denied. By reducing the number of snoop requests that are denied using the mechanism of FIG. 3, the snoop bandwidth or throughput of the cache directory is improved.

A method for improving the snoop bandwidth of a cache directory using the mechanism of FIG. 3 is described below in association with FIGS. 6A-C.

FIGS. 6A-C—Method for Improving the Snoop Bandwidth of a Cache Directory

FIGS. 6A-C are a flowchart of one embodiment of the present invention of a method 600 for improving the snoop bandwidth of a cache directory.

Referring to FIG. 6A, in conjunction with FIGS. 3-5, in step 601, frequency matcher 306 receives a first and a second snoopable address over interconnect 305. In step 602, frequency matcher 306 shifts the cycle speed to a lower speed. In step 603, frequency matcher 306 reads a value in the least significant bit in the congruence class field in the received addresses. In step 604, frequency matcher 306 determines which cache directory 301, 302 to search for the first and second addresses based on the value read in the addresses. As discussed above, if frequency matcher 306 reads a zero, then that address is directed to cache directory 301 since cache directory 301 stores addresses with a zero value in the bit read. If frequency matcher 306 reads a logical value of one, then that address is directed to cache directory 302 since cache directory 302 stores addresses with a logical value of one in the bit read.

In step 605, frequency matcher 306 determines if both of the received addresses are directed to the same cache directory. If so, then frequency matcher 306, in step 606, selects one of the two addresses to be sent to the appropriate multiplexer 303, 304. For example, if both of the addresses have a value of zero in the bit read, then frequency matcher 306 selects one of the addresses to be sent to multiplexer 303. In step 607, the appropriate multiplexer 303, 304 receives a request from processor 201A as well as well as the request sent from frequency matcher 306. In step 608, the appropriate arbiter 309, 310 (arbiter 309 if referring to multiplexer 303 or arbiter 310 if referring to multiplexer 304) selects either the request from processor 201A or the request from frequency matcher 306 to be dispatched to dispatch pipeline 311, 312, respectively. In step 609, the appropriate dispatch pipeline 311, 312 determines if data at the address selected by arbiter 309, 310, respectively, is stored in the cache memory of L3 cache 204 by searching cache directory 301, 302, respectively.

Referring to step 605, as stated above, frequency matcher 306 determines if both of the received addresses are directed to the same cache directory. If both of the received addresses are directed to the same cache directory, then in addition to performing step 606, frequency matcher 306 selects the other address to be sent on bypass pipeline 307 in step 610. In step 611, frequency matcher 308, that received the address sent on bypass pipeline 307, generates a response to retry the request that was sent on bypass pipeline 307.

Referring to step 605, as stated above, frequency matcher 306 determines if both of the received addresses are directed to the same cache directory. Referring to FIG. 6B, in conjunction with FIGS. 3-5, if both of the received addresses are not directed to the same cache directory, then in step 612, frequency matcher 306 transmits the address with the value read of zero to multiplexer 303. In step 613, multiplexer 303 receives the request from processor 201A and the request sent by frequency matcher 306 in step 612. In step 614, arbiter 309 selects either the request from processor 201A or the request received from frequency matcher 306 to be dispatched to dispatch pipeline 311. In step 615, dispatch pipeline 311 determines if data at the address selected by arbiter 309 is stored in the cache memory of L3 cache 204 by searching cache directory 301.

Referring to step 605 in FIG. 6A, as stated above, frequency matcher 306 determines if both of the received addresses are directed to the same cache directory. Referring to FIG. 6B, in conjunction with FIGS. 3-5, if both of the received addresses are not directed to the same cache directory, then in addition to performing step 612, frequency matcher 306 transmits the address with the value read of logical one to multiplexer 304 in step 616. In step 617, multiplexer 304 receives the request from processor 201A and the request sent by frequency matcher 306 in step 616. In step 618, arbiter 310 selects either the request from processor 201A or the request received from frequency matcher 306 to be dispatched to dispatch pipeline 312. In step 619, dispatch pipeline 312 determines if data at the address selected by arbiter 310 is stored in the cache memory of L3 cache 204 by searching cache directory 302.

Referring to FIG. 6C, in conjunction with FIGS. 3-5, upon execution of steps 609, 615 and 619, the appropriate dispatch pipeline 311, 312 determines in step 620 whether the request selected by the appropriate arbiter 309, 310 was from processor 201A. If the request selected by the appropriate arbiter 309, 310 was from processor 201A, then, in step 621, a response indicating whether the data at the requested address lies within the cache memory of L3 cache 204 is generated and transmitted by the appropriate response pipeline 313, 314 to processor 201A as described in detail in the description of FIG. 3.

If the request selected by the appropriate arbiter 309, 310 was not from processor 201A (and hence the request was sent from interconnect 305), then the appropriate dispatch pipeline 311, 312 determines if the data at the snoopable address is located within the cache memory of L3 cache 204 in step 622. If the data at the snoopable address is not located within the cache memory, then, in step 623, response pipeline 313, 314 (response pipeline 313 if dispatch pipeline 311 performs step 622 or response pipeline 314 if dispatch pipeline 312 performs step 622) generates a response indicating that data at snoopable address was not located within the cache memory.

Upon execution of step 623 and step 611, frequency matcher 308 shifts the cycle speed to a higher speed in step 624. In step 625, frequency matcher 308 transmits the speed-shifted response to interconnect 305.

Referring to step 622, if, however, data at the snoopable address (if the address selected in steps 608, 614, 618 correspond to the snoopable address) is located within the cache memory, then, in step 626, response pipeline 313, 314 (response pipeline 313 if dispatch pipeline 311 performs step 622 or response pipeline 314 if dispatch pipeline 312 performs step 622) generates a response indicating that data at the snoopable address was located within the cache memory.

Upon generating a response in step 626, frequency matcher 308 shifts the cycle speed to a higher speed in step 624. In step 625, frequency matcher 308 transmits the speedshifted response to interconnect 305.

It is noted that method 600 may include other and/or additional steps that, for clarity and brevity, are not depicted. It is further noted that method 600 may be executed in a different order presented and that the order presented in the discussion of FIGS. 6A-C is illustrative. It is further noted that certain steps, e.g., steps 606, 610; and steps 612 and 616, in method 600 may be executed in a substantially simultaneous manner.

Although the system, cache and method are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A method for improving the bandwidth of a cache directory comprising the steps of:
   receiving a first and a second address;
   reading a value in a bit in each of said first and said second address;
   determining which of a first and a second cache directory to search for said first and said second address based on said value read in said first and said second address;
   wherein said first cache directory is comprised of entries indicating data stored in a cache memory at addresses with a value of zero at said bit, wherein said second cache directory is comprised of entries indicating data stored in said cache memory at addresses with a value of a logical one at said bit;
   sending said first address to a first multiplexer by a first unit when said value read in both said first and said second address is zero and said second address is selected to be transmitted to a second unit on a bypass path, wherein said first unit is configured to shift a cycle speed to a lower speed, wherein said second unit is configured to shift said cycle speed to a higher speed.

2. A method for improving the bandwidth of a cache directory comprising the steps of:
   receiving a first and a second address;
   reading a value in a bit in each of said first and said second address;
   determining which of a first and a second cache directory to search for said first and said second address based on said value read in said first and said second address;
   wherein said first cache directory is comprised of entries indicating data stored in a cache memory at addresses with a value of zero at said bit, wherein said second cache directory is comprised of entries indicating data stored in said cache memory at addresses with a value of a logical one at said bit;
   receiving a first request to read from or write to an address from a processor and one of said first and said second address;
   selecting one of said first request from said processor and said one of said first and said second address by a first arbitration unit;
   receiving a second request to read from or write to an address from said processor and one of said first and said second address; and
   selecting one of said second request from said processor and said one of said first and said second address by a second arbitration unit.

3. The method as recited in claim 2 further comprising the steps of:
   determining if data at an address selected by said first arbitration unit is stored in said cache memory by searching said first cache directory; and
   determining if data at an address selected by said second arbitration unit is stored in said cache memory by searching said second cache directory.

* * * * *